(12) United States Patent
Nakaie

(10) Patent No.: US 11,706,368 B2
(45) Date of Patent: Jul. 18, 2023

(54) RECORDING MATERIAL TRANSPORTING DEVICE AND IMAGE READING APPARATUS COMPRISING FIRST AND SECOND READING UNITS, USING AN ENDLESS TRANSPORT BELT HAVING AN INNER PERIPHERAL SURFACE WITH A GREATER COEFFICIENT OF FRICTION THAN AN OUTER PERIPHERAL SURFACE AND GENERATING AIRFLOW TO BRING THE RECORDING MATERIAL IN CLOSE CONTACT WITH THE TRANSPORT BELT

(71) Applicant: FUJIFILM Business Innovation Corp., Tokyo (JP)

(72) Inventor: Katsuhiko Nakaie, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/224,145

(22) Filed: Apr. 7, 2021

(65) Prior Publication Data

US 2022/0021782 A1 Jan. 20, 2022

(30) Foreign Application Priority Data

Jul. 15, 2020 (JP) .............................. JP2020-121345

(51) Int. Cl.
*H04N 1/12* (2006.01)
*B65H 5/22* (2006.01)
*H04N 1/00* (2006.01)

(52) U.S. Cl.
CPC ............. *H04N 1/122* (2013.01); *B65H 5/224* (2013.01); *H04N 1/1215* (2013.01)

(58) Field of Classification Search
CPC .......... B65H 2404/28; B65H 2404/531; B65H 2404/5311; B65H 2801/39; B65H 5/244;
(Continued)

(56) References Cited

U.S. PATENT DOCUMENTS 5,022,641 A * 6/1991 Okada ................ G03B 27/6257
271/212
5,280,896 A * 1/1994 Yamada ................. B65H 83/02
198/803.1

(Continued)

FOREIGN PATENT DOCUMENTS

| JP | 2013-082505 | | 5/2013 |
|---|---|---|---|
| JP | 2013082505 A | * | 5/2013 |
| JP | 5937691 | | 6/2016 |

OTHER PUBLICATIONS https://www.engineersedge.com/coeffients_of_friction.htm. Coefficient of Friction Equation and Table Chart. Rubber and Urethane. Copyright 2000-2022. (Year: 2000).*

(Continued)

*Primary Examiner* — Chad Dickerson
(74) *Attorney, Agent, or Firm* — JCIPRNET

(57) ABSTRACT

A recording material transporting device includes a transport belt having an endless shape and having an inner peripheral surface and an outer peripheral surface having a friction coefficient smaller than a friction coefficient of the inner peripheral surface. The transport belt transports a recording material by using the outer peripheral surface toward a reader that reads an image. The recording material transporting device further includes a driving roller that rotates while being in contact with the inner peripheral surface of the transport belt and that rotatably drives the transport belt.

11 Claims, 6 Drawing Sheets

(58) Field of Classification Search
CPC .. H04N 1/1215; H04N 1/122; H04N 1/02865;
H04N 1/02895; H04N 1/02855; G03G
15/5062
USPC ............ 358/498, 474, 1.11–1.18; 271/10.06,
271/10.08, 10.09, 227, 270, 198
See application file for complete search history.

(56) References Cited

U.S. PATENT DOCUMENTS

| | | | | |
|---|---|---|---|---|
| 5,370,384 | A | * | 12/1994 | Romanowski ......... B65H 29/12 |
| | | | | 474/264 |
| 5,419,542 | A | * | 5/1995 | Yamada ................. G03G 15/60 |
| | | | | 271/212 |
| 9,617,077 | B2 | | 4/2017 | Shoji et al. |
| 2004/0178571 | A1 | * | 9/2004 | Ohama .................. B65H 29/14 |
| | | | | 271/272 |
| 2005/0082147 | A1 | * | 4/2005 | Mol ....................... B65G 15/42 |
| | | | | 198/834 |
| 2013/0258420 | A1 | * | 10/2013 | Nakaie ............... H04N 1/02895 |
| | | | | 358/474 |
| 2018/0205845 | A1 | * | 7/2018 | Wilsher ................. H04N 1/122 |

OTHER PUBLICATIONS https://www.sciencedirect.com/topics/chemistry/friction-coefficient. Friction Coefficient. Table 4.7 for Coefficient of Friction of materials. (Year: 2020).*

* cited by examiner

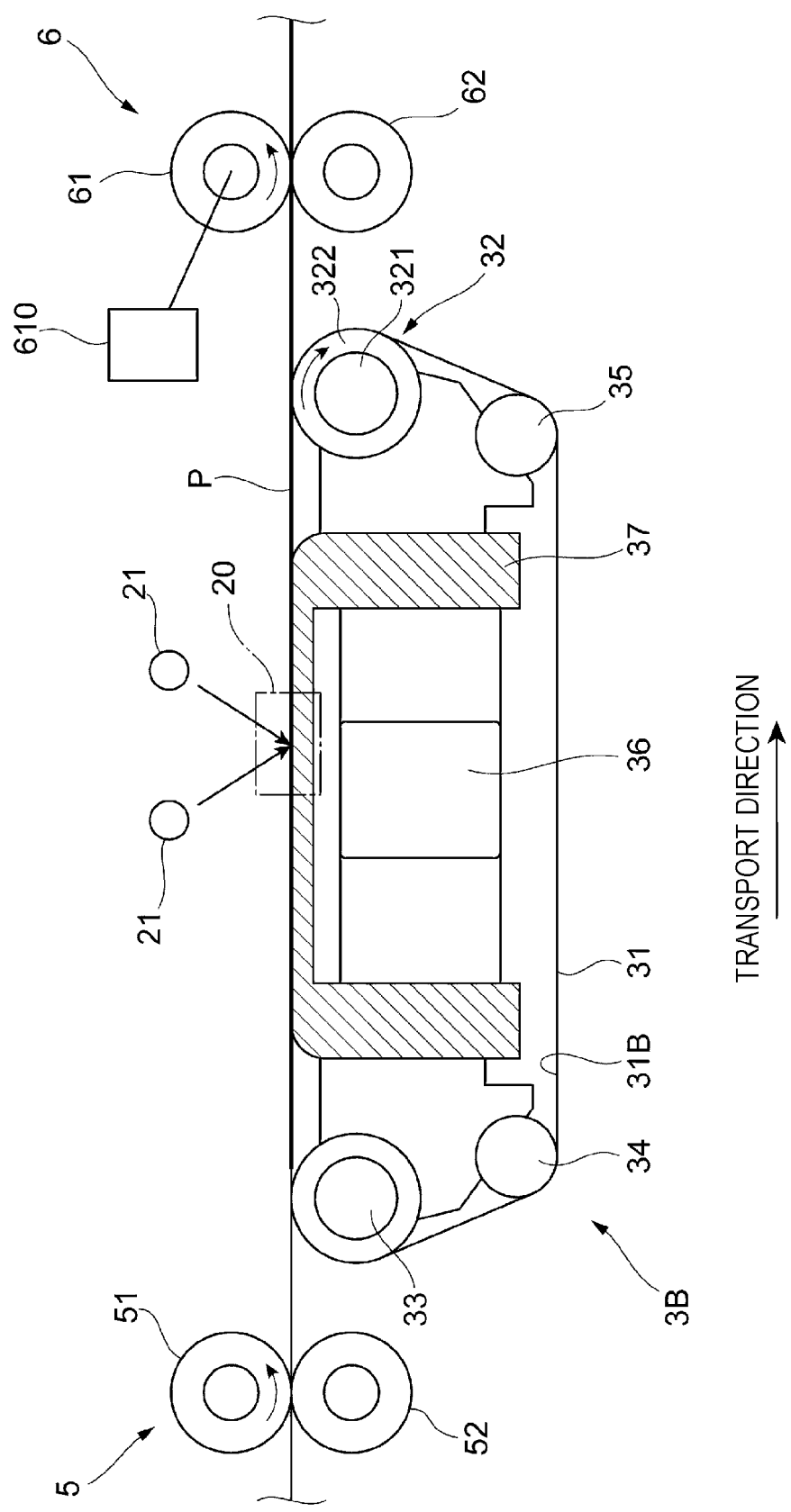

RECORDING MATERIAL TRANSPORTING DEVICE AND IMAGE READING APPARATUS COMPRISING FIRST AND SECOND READING UNITS, USING AN ENDLESS TRANSPORT BELT HAVING AN INNER PERIPHERAL SURFACE WITH A GREATER COEFFICIENT OF FRICTION THAN AN OUTER PERIPHERAL SURFACE AND GENERATING AIRFLOW TO BRING THE RECORDING MATERIAL IN CLOSE CONTACT WITH THE TRANSPORT BELT

CROSS-REFERENCE TO RELATED APPLICATIONS

This application is based on and claims priority under 35 USC 119 from Japanese Patent Application No. 2020-121345 filed Jul. 15, 2020.

BACKGROUND

(i) Technical Field

The present disclosure relates to a recording material transporting device and an image reading apparatus.

(ii) Related Art

Japanese Unexamined Patent Application Publication No. 2013-82505 discloses, as the related art, a sheet transporting device that transports sheets by using an endless transport belt.

SUMMARY

Aspects of non-limiting embodiments of the present disclosure relate to, when a recording material is transported by using a transport belt toward a reader that reads an image formed on the recording material, suppressing misregistration of the recording material with respect to the reader in a direction intersecting a recording material transport direction from occurring, compared with a case in which the friction coefficient of the outer peripheral surface of a transport belt is larger than that of the inner peripheral surface.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a recording material transporting device including a transport belt having an endless shape and having an inner peripheral surface and an outer peripheral surface having a friction coefficient smaller than a friction coefficient of the inner peripheral surface. The transport belt transports a recording material by using the outer peripheral surface toward a reader that reads an image. The recording material transporting device further includes a driving roller that rotates while being in contact with the inner peripheral surface of the transport belt and that rotatably drives the transport belt.

BRIEF DESCRIPTION OF THE DRAWINGS

An exemplary embodiment of the present disclosure will be described in detail based on the following figures, wherein:

FIG. 6 illustrates a second modification of the second transport unit, the second transport roller pair, and the third transport roller pair.

DETAILED DESCRIPTION

Hereinafter, an exemplary embodiment according to the present disclosure will be described with reference to the accompanying drawings.

Overall Configuration of Image Examining Apparatus

Figure 1:
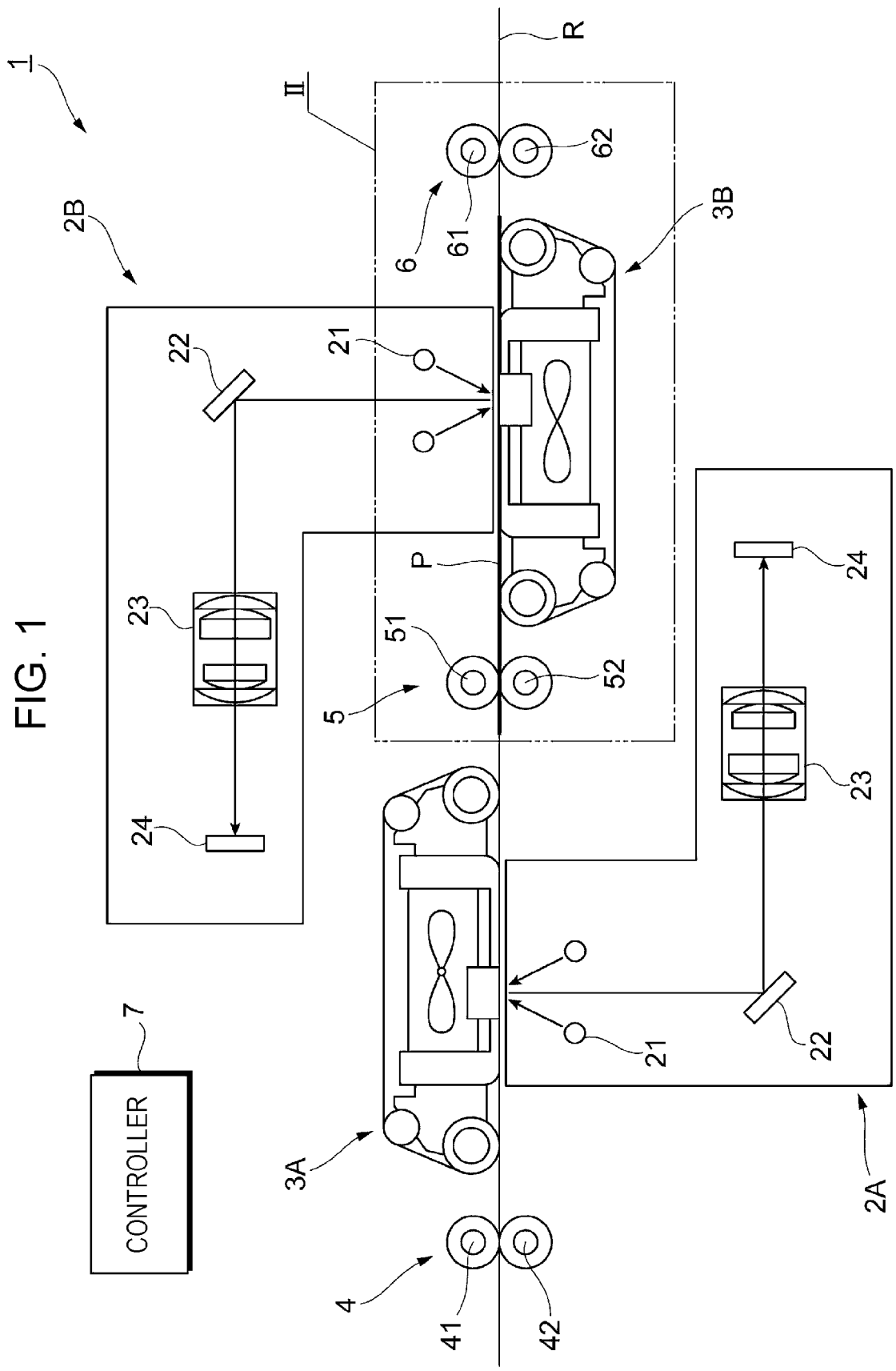
FIG. 1 illustrates schematically the configuration of an image examining apparatus according to the present exemplary embodiment.

FIG. 1 illustrates schematically the configuration of an image examining apparatus 1 according to the present exemplary embodiment.

The image examining apparatus 1, as an example of an image reading apparatus, is used for reading and examining an image formed on a sheet P by an image forming device, which is not illustrated.

The image examining apparatus 1 includes a transport path R on which, as an example of a recording material, a sheet P discharged from the image forming device is transported. In this example, the sheet P is transported on the transport path R from the left side of FIG. 1 toward the right side by, for example, a first transport unit 3A and a second transport unit 3B, which will be described later. In the following description, on the transport path R, a direction in which a sheet P is transported (a direction from the left side of FIG. 1 toward the right side) is sometimes referred to as a sheet P transport direction. In addition, a direction (the depth direction of FIG. 1) intersecting the sheet P transport direction is sometimes referred to as the width direction of a sheet P.

The image examining apparatus 1 includes a first reading unit 2A that reads an image formed on one side of the sheet P transported on the transport path R (the lower side of the sheet P in FIG. 1) and a second reading unit 2B that reads an image formed on the other side of the sheet P transported on the transport path R (the upper side of the sheet P in FIG. 1). In the image examining apparatus 1 according to the present exemplary embodiment, the first reading unit 2A and the second reading unit 2B are arranged side by side in the sheet P transport direction regarding the transport path R. In the present exemplary embodiment, the first reading unit 2A and the second reading unit 2B are examples of a reader that reads an image.

The first reading unit 2A and the second reading unit 2B have similar structures, except for the orientation with respect to the sheet P transported on the transport path R.

Each of the first reading unit 2A and the second reading unit 2B is configured by using a so-called reduction optical system. Specifically, each of the first reading unit 2A and the second reading unit 2B includes a light source 21 that radiates light toward the sheet P, a mirror 22 that reflects the light reflected by the sheet P, an image forming lens 23 that optically reduces the light reflected by the mirror 22 to form an optical image, and an image sensor 24 that converts such an optical image formed by the image forming lens 23 into an electrical signal. In the following description, a region toward which light is radiated by the light source 21 and in which the light is reflected by the sheet P (that is, a region in which an image formed on the sheet P is read) is sometimes referred to as a reading region 20 (refer to FIG. 2).

Each of the first reading unit 2A and the second reading unit 2B is not particularly limited and may be any reading unit capable of reading an image formed on a sheet P. Other than the above-described reduction optical system, for example, a so-called contact optical system using a contact image sensor (CIS) may be adopted.

The image examining apparatus 1 further includes the first transport unit 3A that is disposed so as to face a reading region 20 of the first reading unit 2A and that transports the sheet P toward the reading region 20 and the second transport unit 3B that is disposed so as to face a reading region 20 of the second reading unit 2B and that transports the sheet P toward the reading region 20.

The configurations of the first transport unit 3A and the second transport unit 3B will be described in detail later.

Moreover, the image examining apparatus 1 includes a first transport roller pair 4 that transports a sheet P discharged from the image forming device, toward the first transport unit 3A, a second transport roller pair 5 that transports the sheet P transported through the first transport unit 3A, toward the second transport unit 3B, and a third transport roller pair 6 that transports the sheet P transported through the second transport unit 3B, further downstream.

In the present exemplary embodiment, the first transport roller pair 4 is an example of a transport portion that transports a sheet P toward the first transport unit 3A, and the second transport roller pair 5 is an example of another transport portion that transports a sheet P toward the second transport unit 3B. In addition, in the present exemplary embodiment, the first transport roller pair 4, the first transport unit 3A, and the second transport roller pair 5 are collectively an example of a recording material transporting device. The second transport roller pair 5, the second transport unit 3B, and the third transport roller pair 6 are collectively an example of another recording material transporting device.

The first transport roller pair 4 has a transport roller 41 and a counter roller 42. The transport roller 41 is rotatably driven by a motor, which is not illustrated, in a predetermined direction (the counterclockwise direction in FIG. 1) and transports a sheet P. The counter roller 42 faces the transport roller 41 with the sheet P therebetween and is driven and rotated by the transport roller 41.

Similarly, the second transport roller pair 5 has a transport roller 51 and a counter roller 52. The transport roller 51 is rotatably driven by a motor, which is not illustrated, in a predetermined direction (the counterclockwise direction in FIG. 1) and transports the sheet P. The counter roller 52 faces the transport roller 51 with the sheet P therebetween and is driven and rotated by the transport roller 51.

In addition, the third transport roller pair 6 has a transport roller 61 and a counter roller 62. The transport roller 61 is rotatably driven by a motor, which is not illustrated, in a predetermined direction (the counterclockwise direction in FIG. 1) and transports the sheet P. The counter roller 62 faces the transport roller 61 with the sheet P therebetween and is driven and rotated by the transport roller 61.

The image examining apparatus 1 further includes a controller 7 that controls each part of the image examining apparatus 1.

The controller 7 includes, for example, a central processing unit (CPU), a read-only memory (ROM), and a random access memory (RAM), which are not illustrated. The ROM stores, for example, a basic program (an operation system) executed by the CPU and various settings. The CPU uses the RAM as a working area and executes an application program read from the ROM or a storage unit (not illustrated) such as a semiconductor memory or a hard disc drive (HDD). The following functions of the controller 7 are achieved by the CPU executing such a program.

Image data is input into the controller 7 from the image forming device. In addition, read data acquired by the first reading unit 2A and the second reading unit 2B is input into the controller 7.

The controller 7 divides each of the image data and the read data into predetermined plural regions and performs pattern matching processing on a regional basis. By such processing being performed, whether a defect occurs in an image formed on a sheet P is examined.

Configurations of First Transport Unit and Second Transport Unit

Figure 2:
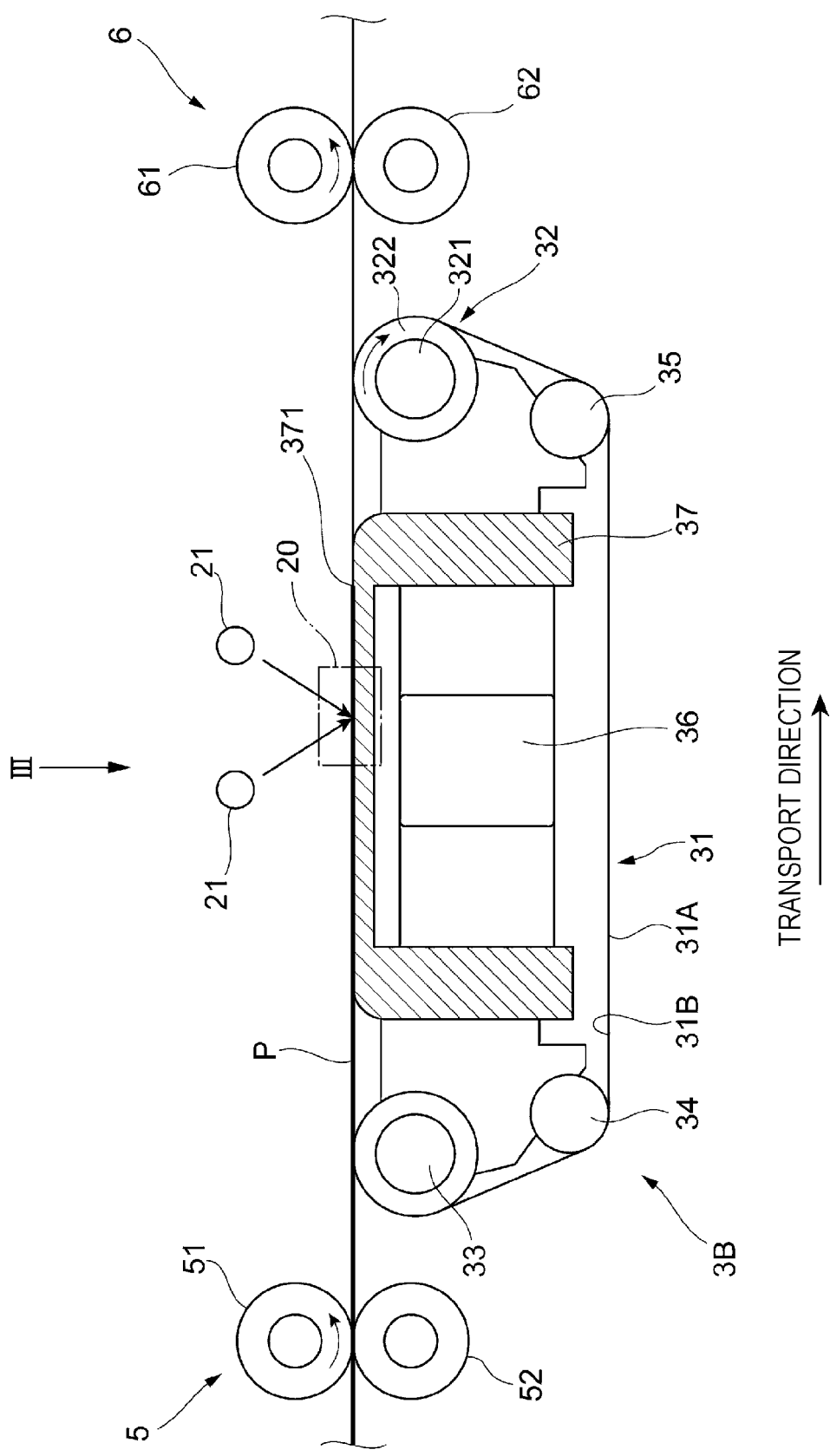
FIG. 2 illustrates the configuration of a second transport unit and is a magnified view of part II in FIG. 1.
Figure 3:
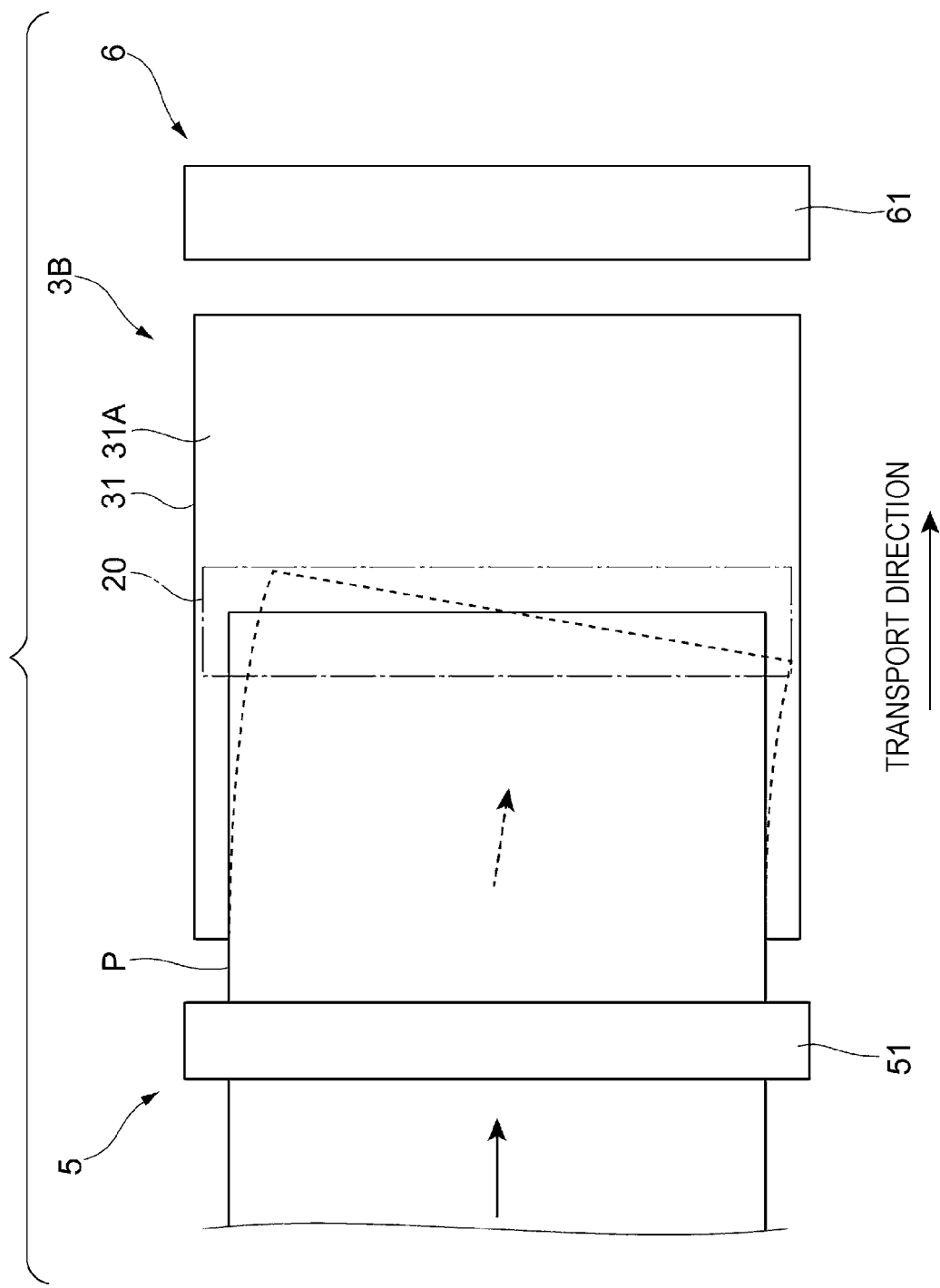
FIG. 3 illustrates the configuration of the second transport unit as viewed in direction III in FIG. 2.

Subsequently, the configurations of the first transport unit 3A and the second transport unit 3B will be described. FIG. 2 illustrates the configuration of the second transport unit 3B and is a magnified view of part II in FIG. 1. FIG. 3 illustrates the configuration of the second transport unit 3B as viewed in direction III in FIG. 2. In FIG. 3, illustration of the light source 21 is omitted.

The first transport unit 3A and the second transport unit 3B have similar structures, except for the orientation with respect to a sheet P transported on the transport path R. The transport units will be described by referring to the second transport unit 3B as an example. In the following description, in the first transport unit 3A, constituents similar to constituents of the second transport unit 3B are sometimes described by being given the same references as those given for the constituents of the second transport unit 3B.

The second transport unit 3B includes: an endless transport belt 31 that transports a sheet P while attracting the sheet P; a driving roller 32 that is in contact with an inner peripheral surface 31B of the transport belt 31 and rotated by a motor, which is not illustrated, so as to rotate the transport belt 31; and a driven roller 33 that is disposed upstream of the driving roller 32 in the sheet P transport direction, supports the transport belt 31 while being in contact with the inner peripheral surface 31B of the transport belt 31, and is driven and rotated by the transport belt 31. The second transport unit 3B further includes support rollers 34 and 35 that are in contact with the inner peripheral surface 31B of the transport belt 31 and that support the transport belt 31 with the driving roller 32 and the driven roller 33. The second transport unit 3B further includes a fan 36 as an example of an airflow generator that sucks air to generate airflow flowing from the outer periphery of the transport belt 31 toward the inner periphery and a support member 37 that accommodates the fan 36 and supports the transport belt 31 while being in contact with the inner peripheral surface 31B of the transport belt 31.

Figure 4:
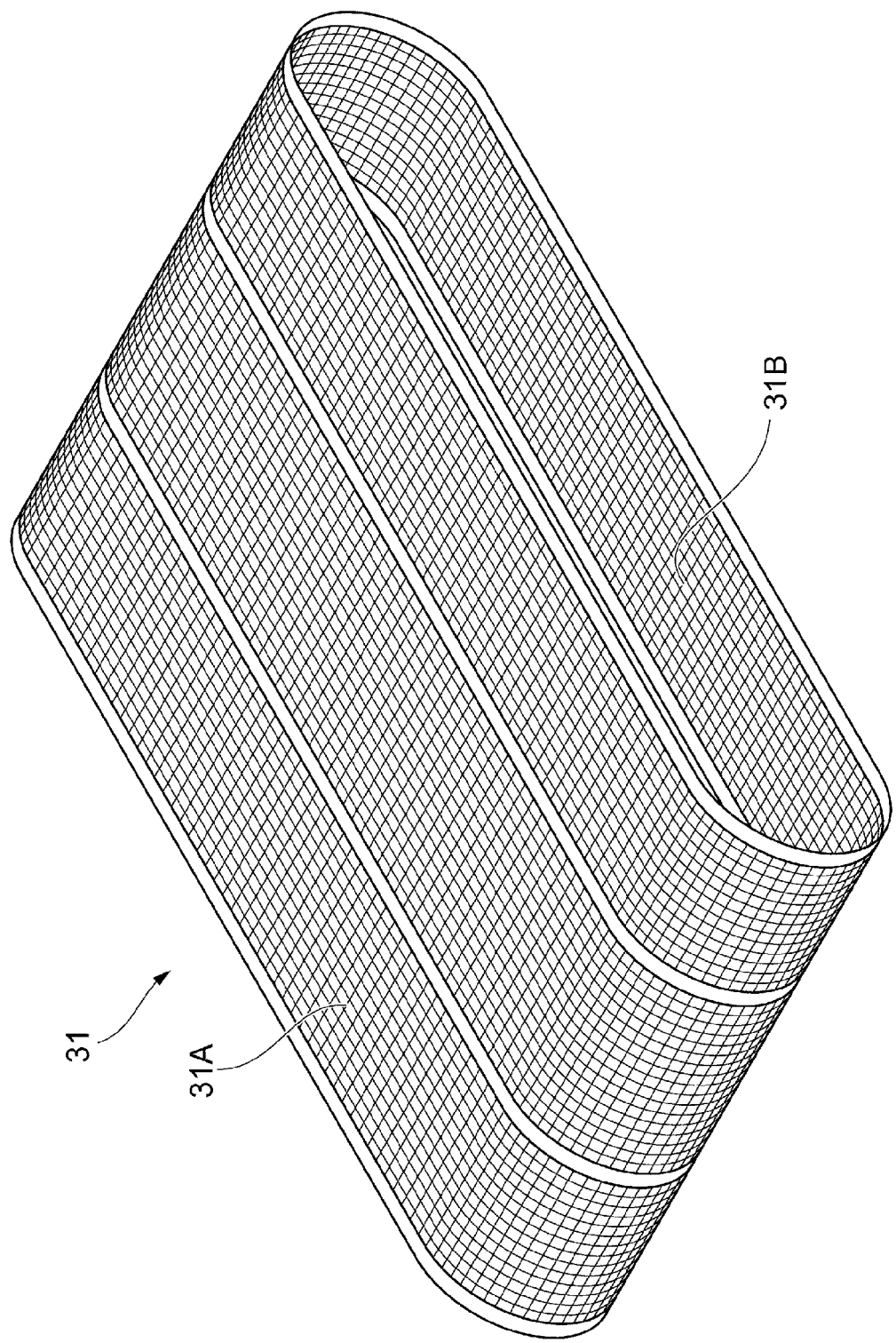
FIG. 4 illustrates schematically the configuration of a transport belt according to the present exemplary embodiment.

FIG. 4 illustrates schematically the configuration of the transport belt 31 according to the present exemplary embodiment. The transport belt 31 is made of a sheet-shaped material having air permeability with which airflow may pass through the transport belt 31 between the outer periphery side and the inner periphery side of the transport belt 31.

In this example, as FIG. 4 illustrates, the transport belt 31 has a mesh form having air permeability. More specifically, the transport belt 31 is constituted by a textile woven by using fibers made of a resin such as polyamide.

The transport belt 31 is not limited to such a mesh form and may be any form having air permeability. For example, the transport belt 31 may be a sheet form having plural through holes with which the outer periphery side and the inner periphery side communicate with one another.

Regarding the transport belt 31 according to the present exemplary embodiment, the friction coefficient of an outer peripheral surface 31A that attracts and transports a sheet P is smaller than the friction coefficient of the inner peripheral surface 31B.

A method for causing, in the transport belt 31, the outer peripheral surface 31A to have a smaller friction coefficient than the inner peripheral surface 31B is not particularly limited. Examples of such a method include a method in which different coatings are formed on the outer peripheral surface 31A and the inner peripheral surface 31B and a method in which the outer peripheral surface 31A and the inner peripheral surface 31B are subjected to different surface treatments.

The function of causing, in the transport belt 31, the outer peripheral surface 31A to have a smaller friction coefficient than the inner peripheral surface 31B will be described later.

Referring back to FIG. 2, the driving roller 32 has a shaft 321 extending in the width direction and an elastic layer 322 formed on the outer peripheral surface of the shaft 321. The driving roller 32 rotates in a manner such that the shaft 321 is rotatably driven in a predetermined direction (in this example, the clockwise direction) by the motor, which is not illustrated.

Here, in the present exemplary embodiment, the transport belt 31 is driven by the driving roller 32 that comes into contact with a portion of the inner peripheral surface 31B of the transport belt 31 on the most downstream side in the transport direction. More specifically, the driving roller 32 is in contact with the inner peripheral surface 31B of the transport belt 31, in the transport direction, downstream of the driven roller 33 and the support rollers 34 and 35 that all support the transport belt 31 with the driving roller 32. Thus, the transport belt 31 is suppressed from slackening in a region including the reading region 20 located between the driven roller 33 and the driving roller 32.

The fan 36 generates airflow flowing from the outer periphery of the transport belt 31 toward the inner periphery by sucking air. The structure of the fan 36 is not particularly limited, and the fan 36 may have any structure capable of sucking air. For example, a fan such as a sirocco fan or a propeller fan may be used.

The fan 36 is disposed on the inner periphery side of the transport belt 31 so as to face the reading region 20 with the transport belt 31 therebetween. In the second transport unit 3B according to the present exemplary embodiment, the fan 36 generates airflow flowing from the outer periphery of the transport belt 31 toward the inner periphery, and the outer peripheral surface 31A of the transport belt 31 thereby attracts a sheet P that has been transported onto the transport belt 31.

The support member 37 has an elongated shape extending in the width direction intersecting the sheet P transport direction. The support member 37 has a guide surface 371 that is in contact with the inner peripheral surface 31B of the transport belt 31 and guides movement of the transport belt 31. The guide surface 371 is constituted by a flat surface extending in the sheet P transport direction. The guide surface 371 is provided so as to face the second reading unit 2B (refer to FIG. 1) with the transport belt 31 therebetween. More specifically, the guide surface 371 is provided so as to face the second reading unit 2B with a predetermined distance therebetween. Such a distance between the guide surface 371 and the second reading unit 2B is determined in accordance with, for example, a radiating distance of light radiated by the light source 21 of the second reading unit 2B or a focal length of the image forming lens 23.

In addition, the guide surface 371 has plural through holes extending from a side on which the guide surface 371 is in contact with the transport belt 31 to a side on which the guide surface 371 faces the fan 36. Thus, when the fan 36 rotates, air passes through the transport belt 31 and the guide surface 371 and is sucked by the fan 36.

In the second transport unit 3B according to the present exemplary embodiment, the height of the guide surface 371 of the support member 37 and the height of an uppermost portion of each of the driving roller 32 and the driven roller 33 are equal to one another. More specifically, in the second transport unit 3B, while moving from the driven roller 33, passing along the guide surface 371 of the support member 37, and reaching the driving roller 32, the transport belt 31 rotates with the orientation being maintained horizontal with respect to the transport direction. Thus, a sheet P is less likely to rise and separate from the outer peripheral surface 31A of the transport belt 31, and the distance between the second reading unit 2B and one side of the sheet P is suppressed from fluctuating.

Operation of Image Examining Apparatus

Subsequently, an operation of the image examining apparatus 1 according to the present exemplary embodiment will be described. When the image examining apparatus 1 examines an image formed on a sheet P, the first transport roller pair 4, the second transport roller pair 5, the third transport roller pair 6, the first transport unit 3A, and the second transport unit 3B are driven. Specifically, power is supplied to the motors (not illustrated) that drive the transport roller 41 of the first transport roller pair 4, the transport roller 51 of the second transport roller pair 5, and the transport roller 61 of the third transport roller pair 6. Thus, the transport roller 41 of the first transport roller pair 4, the transport roller 51 of the second transport roller pair 5, and the transport roller 61 of the third transport roller pair 6 rotate in a predetermined direction.

In each of the first transport unit 3A and the second transport unit 3B, power is supplied to the motor (not illustrated) that drives the driving roller 32, and the driving roller 32 rotates in a predetermined direction. Thus, the transport belt 31 rotates in each of the first transport unit 3A and the second transport unit 3B. Moreover, in each of the first transport unit 3A and the second transport unit 3B, the fan 36 is rotated by being supplied with power, and air is sucked.

Next, a sheet P on which an image is formed by, for example, the image forming device, which is not illustrated, is delivered to the image examining apparatus 1. The sheet P that has been delivered to the image examining apparatus 1 is transported downstream in the transport direction by the first transport roller pair 4. When the leading end of the sheet P reaches the transport belt 31 of the first transport unit 3A, the sheet P is attracted to the outer peripheral surface 31A of the transport belt 31 due to airflow generated by the fan 36. The sheet P, while being attracted to the outer peripheral surface 31A of the transport belt 31, is then transported further downstream in the transport direction in accordance with the rotation of the transport belt 31.

When the sheet P reaches the reading region 20 in which the first reading unit 2A performs reading, the first reading unit 2A reads an image formed on one side of the sheet P facing the first reading unit 2A (the lower side of the sheet P in FIG. 1). Specifically, the light source 21 of the first reading unit 2A radiates light toward the sheet P, and the reflected light is input into the image sensor 24 via the mirror 22 and via the image forming lens 23. The controller 7 performs pattern matching processing between read data that has been input into the image sensor 24 and thus obtained and image data input from the image forming device, and whether a defect occurs in the image formed on one side of the sheet P is examined.

Here, in the first transport unit 3A according to the present exemplary embodiment, when passing through the reading region 20 of the first reading unit 2A, the sheet P is attracted to the outer peripheral surface 31A of the transport belt 31 due to airflow generated by the fan 36. Thus, the sheet P is less likely to rise and separate from the outer peripheral surface 31A of the transport belt 31, and the distance between the first reading unit 2A and one side of the sheet P is suppressed from fluctuating, compared with a case in which a sheet P is not attracted to the outer peripheral surface 31A of the transport belt 31. Consequently, the accuracy of image reading performed by the first reading unit 2A is suppressed from decreasing.

Next, the sheet P that has passed the first transport unit 3A is transported further downstream of the second transport roller pair 5 in the transport direction. When the leading end of the sheet P reaches the transport belt 31 of the second transport unit 3B, the sheet P is attracted to the outer peripheral surface 31A of the transport belt 31 due to airflow generated by the fan 36. The sheet P, while being attracted to the outer peripheral surface 31A of the transport belt 31, is then transported further downstream in accordance with the rotation of the transport belt 31.

When the sheet P reaches the reading region 20 in which the second reading unit 2B performs reading, the second reading unit 2B reads an image formed on the other side of the sheet P facing the second reading unit 2B (the upper side of the sheet P in FIG. 1). Specifically, the light source 21 of the second reading unit 2B radiates light toward the sheet P, and the reflected light is input into the image sensor 24 via the mirror 22 and via the image forming lens 23. The controller 7 performs pattern matching processing between read data that has been input into the image sensor 24 and thus obtained and image data input from the image forming device, and whether a defect occurs in the image formed on the other side of the sheet P is examined.

Here, in the second transport unit 3B according to the present exemplary embodiment, as with the first transport unit 3A, when passing through the reading region 20 of the second reading unit 2B, the sheet P is attracted to the outer peripheral surface 31A of the transport belt 31 due to airflow generated by the fan 36. Thus, the sheet P is less likely to rise and separate from the outer peripheral surface 31A of the transport belt 31, and the distance between the second reading unit 2B and the other side of the sheet P is suppressed from fluctuating, compared with a case in which a sheet P is not attracted to the outer peripheral surface 31A of the transport belt 31. As a result, the accuracy of image reading performed by the second reading unit 2B is suppressed from decreasing.

After that, the sheet P that has passed the second transport unit 3B is transported further downstream of the third transport roller pair 6 in the transport direction and discharged from the image examining apparatus 1. Consequently, such a series of processes in the image examining apparatus 1 is finished.

Function of First Transport Unit and Second Transport Unit

In the image examining apparatus 1 that operates as described above, a direction in which the transport belt 31 of the first transport unit 3A transports a sheet P may be shifted from a direction in which the first transport roller pair 4, which transports a sheet P to the transport belt 31, transports the sheet P, and the same applies to a direction in which the second transport unit 3B transports the sheet P and a direction in which the second transport roller pair 5 transports the sheet P.

For example, when the direction in which the transport belt 31 of the second transport unit 3B transports the sheet P is shifted from the direction in which the second transport roller pair 5 transports the sheet P, as the broken line in FIG. 3 illustrates, the sheet P that has been transported onto the transport belt 31 from the second transport roller pair 5 may shift in the width direction and may be transported while meandering. Consequently, the position of the sheet P with respect to the reading region 20 shifts in the width direction, the accuracy of image reading performed by the second reading unit 2B decreases, and it may thereby be impossible to examine an image with accuracy.

Although illustration is omitted, a similar problem may arise between the first transport unit 3A and the first transport roller pair 4.

For such a problem, in the second transport unit 3B according to the present exemplary embodiment, as described above, the friction coefficient of the outer peripheral surface 31A of the transport belt 31 is smaller than that of the inner peripheral surface 31B. Thus, a force to restrain a sheet P, which is attracted to the transport belt 31, to the outer peripheral surface 31A is smaller than such a force in a case in which, for example, the friction coefficient of the outer peripheral surface 31A of the transport belt 31 is larger than that of the inner peripheral surface 31B. In other words, the friction coefficient of the outer peripheral surface 31A of the transport belt 31 is smaller than that of the inner peripheral surface 31B, and the sheet P is thereby likely to slide on the outer peripheral surface 31A of the transport belt 31 in the width direction.

As a result, on the outer peripheral surface 31A of the transport belt 31, the sheet P that has been transported onto the transport belt 31 from the second transport roller pair 5 is transported in the direction in which the second transport roller pair 5 transports the sheet P when the direction in which the second transport roller pair 5 transports the sheet P is shifted from the direction in which the transport belt 31 of the second transport unit 3B transports the sheet P. Accordingly, the sheet P is suppressed from shifting with respect to the reading region 20 in the width direction while being transported, and the accuracy of image reading performed by the second reading unit 2B is suppressed from decreasing.

Similarly, in the first transport unit 3A, although illustration is omitted, on the outer peripheral surface 31A of the transport belt 31, the friction coefficient of the outer peripheral surface 31A of the transport belt 31 is smaller than that of the inner peripheral surface 31B, and the sheet P that has been transported onto the transport belt 31 from the first transport roller pair 4 is thereby transported in the direction in which the first transport roller pair 4 transports the sheet P. Thus, the sheet P is suppressed from shifting with respect to the reading region 20 in the width direction while being transported, and the accuracy of image reading performed by the first reading unit 2A is suppressed from decreasing.

Here, in the present exemplary embodiment, in the first transport unit 3A, the friction coefficient of the outer peripheral surface 31A of the transport belt 31 may be smaller than that of the outer peripheral surface of the transport roller 41 of the first transport roller pair 4. Thus, on the outer peripheral surface 31A of the transport belt 31, transporting a sheet P in the direction in which the first transport roller pair 4 transports the sheet P is facilitated, and the sheet P is further suppressed from shifting with respect to the reading region 20 in the width direction while being transported.

Similarly, in the second transport unit 3B, the friction coefficient of the outer peripheral surface 31A of the transport belt 31 may be smaller than that of the outer peripheral surface of the transport roller 51 of the second transport roller pair 5. Thus, on the outer peripheral surface 31A of the transport belt 31, transporting a sheet P in the direction in which the second transport roller pair 5 transports the sheet P is facilitated, and the sheet P is further suppressed from shifting with respect to the reading region 20 in the width direction while being transported.

Moreover, in the present exemplary embodiment, regarding the first transport unit 3A and the first transport roller pair 4, a force applied to a sheet P due to the friction coefficient of the outer peripheral surface 31A of the transport belt 31 and due to a force to bring the sheet P that is attracted to the transport belt 31 by the fan 36, into close contact with the transport belt 31 may be smaller than a force of the first transport roller pair 4 to transport the sheet P. In other words, a force applied to a sheet P due to the friction coefficient of the outer peripheral surface 31A of the transport belt 31 and due to a suction force generated by the fan 36 may be smaller than a force applied to the sheet P due to a force generated between the transport roller 41 and the counter roller 42 of the first transport roller pair 4 and due to the friction coefficient of the outer peripheral surface of the transport roller 41.

Thus, on the outer peripheral surface 31A of the transport belt 31, transporting the sheet P in the direction in which the first transport roller pair 4 transports the sheet P is facilitated, and the sheet P is further suppressed from shifting with respect to the reading region 20 in the width direction while being transported.

Similarly, regarding the second transport unit 3B and the second transport roller pair 5, a force applied to a sheet P due to the friction coefficient of the outer peripheral surface 31A of the transport belt 31 and due to a force to bring the sheet P that is attracted to the transport belt 31 by the fan 36, into close contact with the transport belt 31 may be smaller than a force of the second transport roller pair 5 to transport the sheet P. In other words, a force applied to a sheet P due to the friction coefficient of the outer peripheral surface 31A of the transport belt 31 and due to a suction force generated by the fan 36 may be smaller than a force applied to the sheet P due to a force generated between the transport roller 51 and the counter roller 52 of the second transport roller pair 5 and due to the friction coefficient of the outer peripheral surface of the transport roller 51.

Thus, on the outer peripheral surface 31A of the transport belt 31, transporting the sheet P in the direction in which the second transport roller pair 5 transports the sheet P is facilitated, and the sheet P is further suppressed from shifting with respect to the reading region 20 in the width direction while being transported.

Furthermore, in the present exemplary embodiment, when the first transport unit 3A and the second transport unit 3B are compared, the friction coefficient of the inner peripheral surface 31B of the transport belt 31 of the second transport unit 3B located downstream in the transport direction may be larger than that of the transport belt 31 of the first transport unit 3A. In such a case, the transport belt 31 of the second transport unit 3B located downstream in the transport direction is an example of another transport belt, and the driving roller 32 that drives the transport belt 31 of the second transport unit 3B is an example of another driving roller.

By adopting such a configuration, a force of the transport belt 31 of the second transport unit 3B to transport a sheet P is larger than a force of the transport belt 31 of the first transport unit 3A to transport the sheet P. As a result, for example, when a sheet P is transported while extending over the first transport unit 3A and the second transport unit 3B, the sheet P is likely to be pulled by the second transport unit 3B located downstream in the transport direction. Consequently, the sheet P is suppressed from slackening between the first transport unit 3A and the second transport unit 3B.

Modifications

Subsequently, modifications of the present exemplary embodiment will be described. In the following description, constituents similar to the constituents illustrated in FIGS. 1 to 4 are given references similar to those given in FIGS. 1 to 4, and the detailed description will be omitted here.

Figure 5:
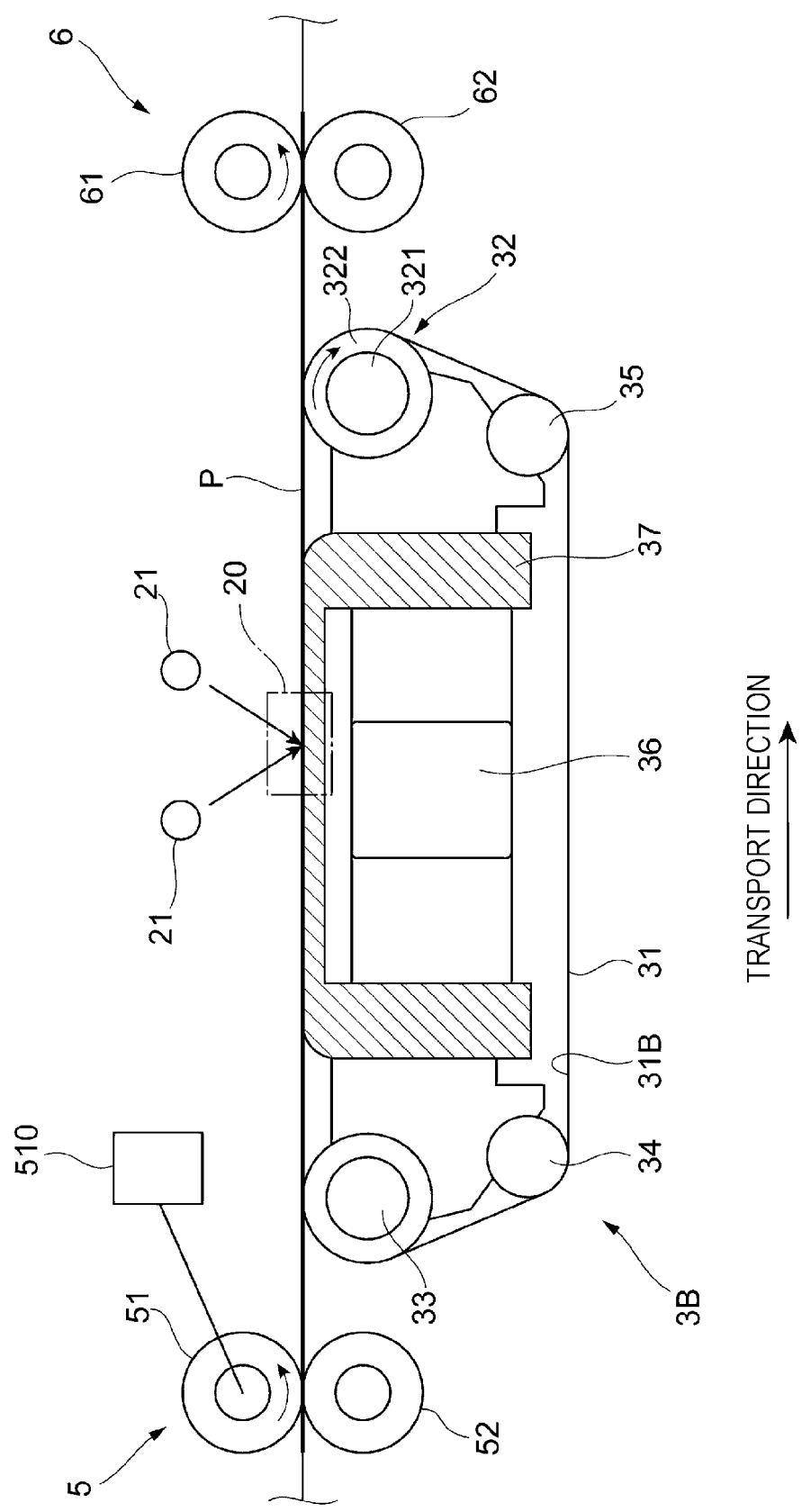
FIG. 5 illustrates a first modification of the second transport unit, a second transport roller pair, and a third transport roller pair.

FIG. 5 illustrates a first modification of the second transport unit 3B, the second transport roller pair 5, and the third transport roller pair 6.

Regarding the second transport roller pair 5 of the first modification illustrated in FIG. 5, a one-way clutch 510, as an example of a drive controller, is disposed between the transport roller 51 and the motor (not illustrated) that rotatably drives the transport roller 51. In addition, in the first modification, the rotational speed of the transport roller 61 of the third transport roller pair 6 is set to faster than that of the transport roller 51 of the second transport roller pair 5. In the first modification, the second transport roller pair 5 is an example of a transport portion, the third transport roller pair 6 is an example of another transport portion, the transport roller 51 of the second transport roller pair 5 is an example of a transport roller, and the transport roller 61 of the third transport roller pair 6 is an example of another transport roller.

In the first modification illustrated in FIG. 5, when the leading end of a sheet P transported by the second transport roller pair 5 has entered the third transport roller pair 6 and the sheet P is pulled by the third transport roller pair 6 in the transport direction, drive of the transport roller 51 of the second transport roller pair 5 is released by the function of the one-way clutch 510, the transport roller 51 rotates freely, and the trailing end of the sheet P is thereby pulled out from the second transport roller pair 5.

Thus, when the sheet P is transported while extending over the second transport roller pair 5 and the third transport roller pair 6, the sheet P is transported in response to a driving force from the third transport roller pair 6. Consequently, the sheet P is suppressed from slackening on the transport belt 31 located between the second transport roller pair 5 and the third transport roller pair 6, and the distance between the second reading unit 2B and the other side of the sheet P is suppressed from fluctuating.

FIG. 6 illustrates a second modification of the second transport unit 3B, the second transport roller pair 5, and the third transport roller pair 6.

Regarding the third transport roller pair 6 of the second modification illustrated in FIG. 6, a torque limiter 610, as an example of another drive controller, is disposed between the transport roller 61 and the motor (not illustrated) that rotatably drives the transport roller 61. In addition, in the second modification, as with the first modification, the rotational speed of the transport roller 61 of the third transport roller pair 6 is set to faster than that of the transport roller 51 of the second transport roller pair 5. In the second modification, the second transport roller pair 5 is an example of a transport portion, the third transport roller pair 6 is an example of another transport portion, the transport roller 51 of the second transport roller pair 5 is an example of a transport roller, and the transport roller 61 of the third transport roller pair 6 is an example of another transport roller.

In the second modification illustrated in FIG. 6, while a sheet P is transported by the second transport roller pair 5 of which the rotational speed is slow and even if the leading end of the sheet P enters the third transport roller pair 6, the torque limiter 610 releases transmission of a driving force to the transport roller 61, and the transport roller 61 rotates freely. In other words, when the sheet P is transported while extending over the second transport roller pair 5 and the third transport roller pair 6, the sheet P is transported in response to a driving force from the second transport roller pair 5.

After that, when the trailing end of the sheet P is discharged from the second transport roller pair 5, such an above-described state is switched to a state in which the torque limiter 610 transmits a driving force to the transport roller 61. Thus, the sheet P is transported in response to a driving force from the third transport roller pair 6. More specifically, the sheet P is pulled downstream in the transport direction by being transported by the third transport roller pair 6 of which the rotational speed is fast.

Thus, the sheet P is suppressed from slackening on the transport belt 31 located between the second transport roller pair 5 and the third transport roller pair 6, and the distance between the second reading unit 2B and the other side of the sheet P is suppressed from fluctuating.

Note that, although, in FIGS. 5 and 6, the second transport unit 3B, the second transport roller pair 5, and the third transport roller pair 6 are illustrated and described, the first transport unit 3A, the first transport roller pair 4, and the second transport roller pair 5 may have a similar configuration.

Hereinabove, the exemplary embodiment according to the present disclosure is described. However, the exemplary embodiment of the present disclosure is not limited to the above-described exemplary embodiment, and various modifications may be made as needed without departing from the object of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A recording material transporting device comprising:
    a transport belt having an endless shape and having an inner peripheral surface and an outer peripheral surface which is on an opposite side of the inner peripheral surface and the entire outer peripheral surface having a friction coefficient smaller than a friction coefficient of the entire inner peripheral surface, the transport belt transporting a recording material by using the outer peripheral surface toward an image sensor that reads an image;
    a driving roller that rotates while being in contact with the inner peripheral surface of the transport belt and that rotatably drives the transport belt;
    a fan that generates airflow flowing from an outer periphery of the transport belt toward an inner periphery of the transport belt to bring a recording medium into close contact with the outer peripheral surface of the transport belt facing the image sensor; and
    a transport roller that is disposed upstream of the transport belt in a recording material transport direction and that transports a recording material toward the transport belt, wherein a force applied to a recording material due to the friction coefficient of the outer peripheral surface of the transport belt and due to a force generated by the fan to bring the recording material into close contact with the transport belt is smaller than a force of the transport roller to transport the recording material.

2. The recording material transporting device according to claim 1, wherein the outer peripheral surface of the transport belt faces the image sensor with a gap therebetween.

3. The recording material transporting device according to claim 1, further comprising:
    a driven roller that is in contact with the inner peripheral surface of the transport belt and that is rotated as the transport belt is rotatably driven by the driving roller,
    wherein the driving roller is in contact with the inner peripheral surface of the transport belt at a position downstream of the driven roller in a recording material transport direction.

4. The recording material transporting device according to claim 1, further comprising:
    a transport roller that is disposed upstream of the transport belt in a recording material transport direction and that transports a recording material toward the transport belt.

5. The recording material transporting device according to claim 4,
    wherein the transport roller has a transport roller that is rotatably driven to transport a recording material toward the transport belt and a counter roller facing the transport roller with a recording material therebetween, and
    wherein the friction coefficient of the outer peripheral surface of the transport belt is smaller than a friction coefficient of the transport roller.

6. The recording material transporting device according to claim 4, further comprising:
    another transport roller that is disposed downstream of the transport belt in the recording material transport direction and that further transports a recording material transported by the transport belt,
    wherein the transport roller has a transport roller that is rotatably driven to transport a recording material toward the transport belt, a counter roller facing the transport roller with a recording material therebetween, and a drive controller that releases drive of the transport roller when a recording material is transported by the transport roller and the other transport roller.

7. The recording material transporting device according to claim 4, further comprising:
another transport roller that is disposed downstream of the transport belt in the recording material transport direction and that further transports a recording material transported by the transport belt,
wherein the other transport roller has another transport roller that is rotatably driven to transport a recording material, another counter roller facing the other transport roller with a recording material therebetween, and another drive controller that releases drive of the other transport roller when a recording material is transported by the transport roller and the other transport roller.

8. The recording material transporting device according to claim 1, further comprising:
another transport belt having an endless shape and having an inner peripheral surface and an outer peripheral surface having a friction coefficient smaller than a friction coefficient of the inner peripheral surface, the other transport belt transporting a recording material by using the outer peripheral surface toward another image sensor that reads an image at a position downstream of the image sensor in a transport direction; and
another driving roller that rotates while being in contact with the inner peripheral surface of the other transport belt and that rotatably drives the other transport belt.

9. The recording material transporting device according to claim 8, wherein
the friction coefficient of the inner peripheral surface of the other transport belt is larger than the friction coefficient of the inner peripheral surface of the transport belt.

10. The recording material transporting device according to claim 9,
wherein the transport belt and the other transport belt transport a recording material while being in contact with different sides of the recording material.

11. An image reading apparatus comprising:
an image sensor that reads an image formed on a recording material;
a transport belt having an endless shape and having an inner peripheral surface and an outer peripheral surface which is on an opposite side of the inner peripheral surface and the entire outer peripheral surface having a friction coefficient smaller than a friction coefficient of the entire inner peripheral surface, the transport belt transporting a recording material by using the outer peripheral surface toward the image sensor; and
a driving roller that rotates while being in contact with the inner peripheral surface of the transport belt and that rotatably drives the transport belt
a fan that generates airflow flowing from an outer periphery of the transport belt toward an inner periphery of the transport belt to bring a recording medium into close contact with the outer peripheral surface of the transport belt facing the image sensor; and
a transport roller that is disposed upstream of the transport belt in a recording material transport direction and that transports a recording material toward the transport belt, wherein a force applied to a recording material due to the friction coefficient of the outer peripheral surface of the transport belt and due to a force generated by the fan to bring the recording material into close contact with the transport belt is smaller than a force of the transport roller to transport the recording material.

* * * * *